UNITED STATES PATENT OFFICE.

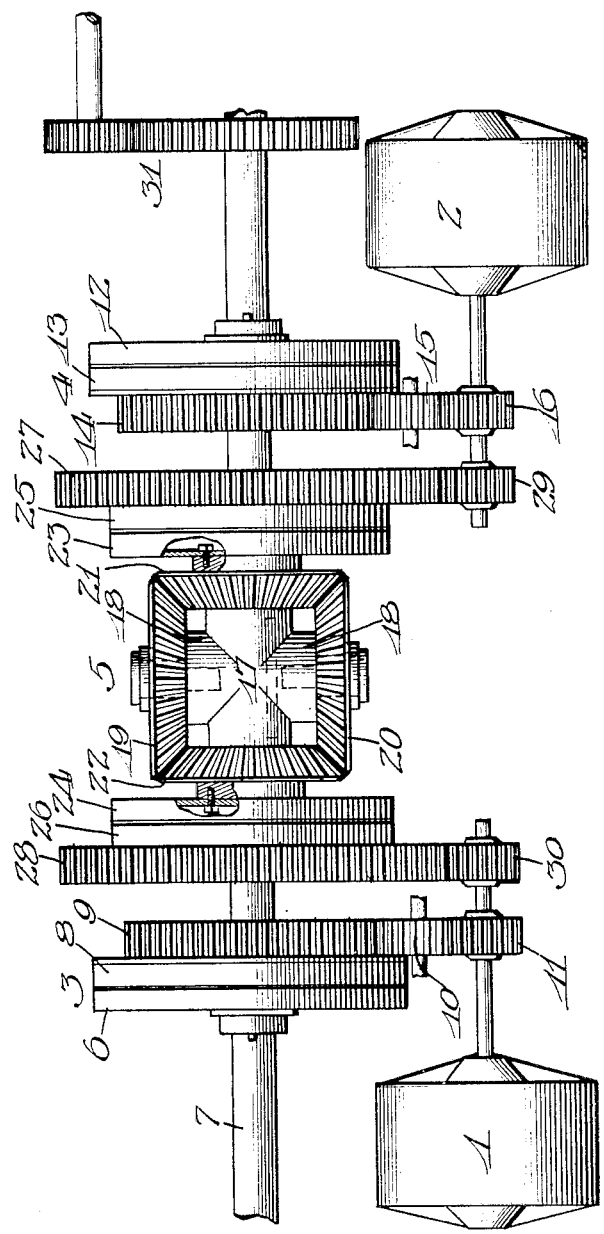

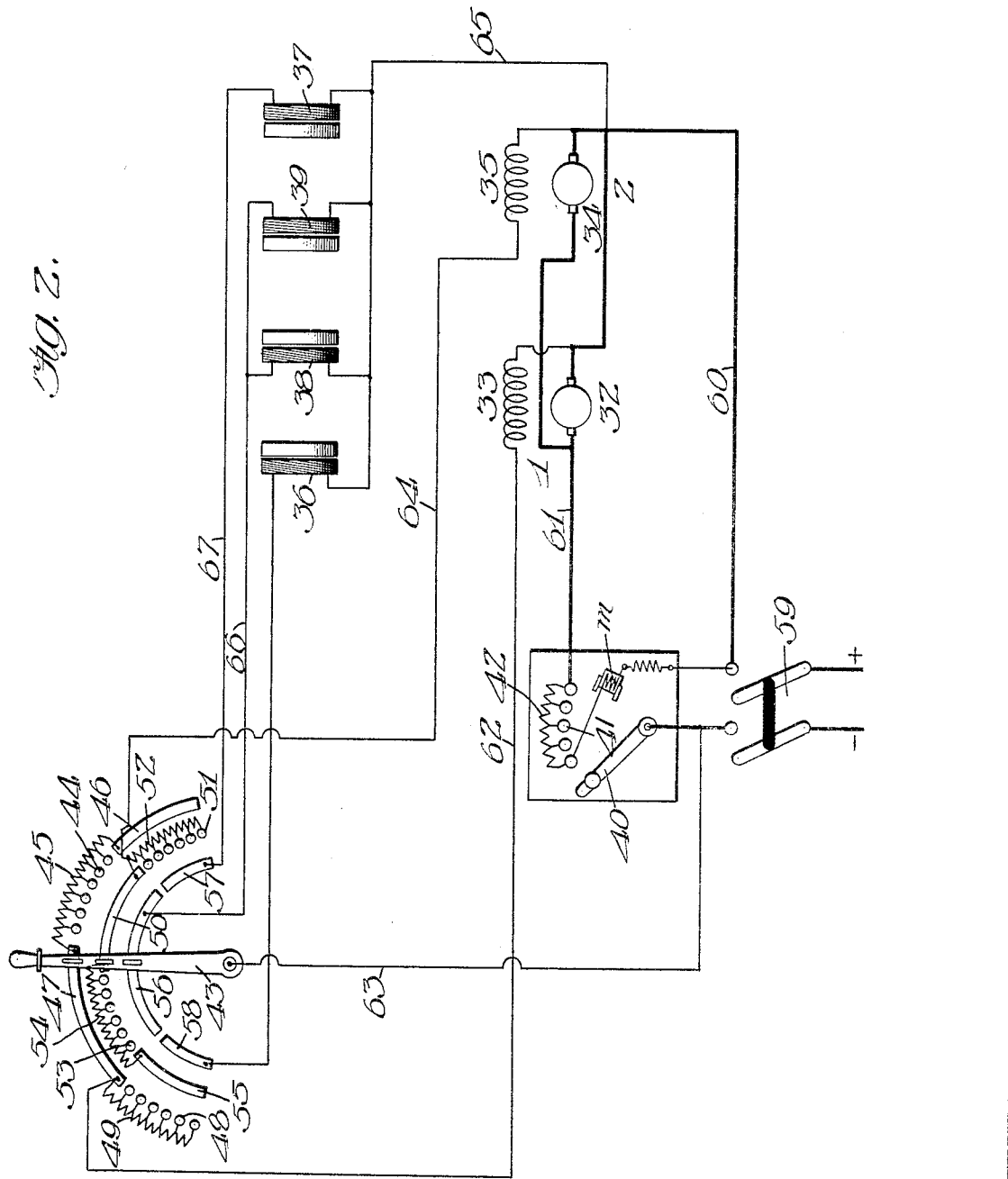

THOMAS E. BARNUM, OF MILWAUKEE, WISCONSIN, ASSIGNOR TO CUTLER-HAMMER CLUTCH CO., OF MILWAUKEE, WISCONSIN, A CORPORATION OF WISCONSIN.

DRIVING MECHANISM FOR TURRETS AND THE LIKE.

1,130,054.  Specification of Letters Patent.  Patented Mar. 2, 1915.

Application filed August 27, 1907. Serial No. 390,304.

*To all whom it may concern:*

Be it known that I, THOMAS E. BARNUM, a citizen of the United States, residing at Milwaukee, in the county of Milwaukee and State of Wisconsin, have invented new and useful Improvements in Driving Mechanism for Turrets and the like, of which the following is a full, clear, concise, and exact description, reference being had to the accompanying drawing, forming a part of this specification.

My invention relates to improvements in means for driving and controlling the speed of heavy mechanisms, such, for instance, as gun operating mechanism or turret operating mechanism.

The object of my invention is to provide an apparatus particularly adapted for operating gun operating devices and turret controlling mechanisms, in which is combined a direct drive from the source of motive power and a reversing differential gear whereby a wide range of speed control is obtained.

For the purpose of disclosing my invention, I have illustrated in the accompanying drawings one embodiment thereof.

In said drawings: Figure I is a top plan view of the apparatus, certain of the parts being shown in section, Fig. II is a diagrammatic view of the circuit arrangement of one form of controlling means for the motors which I employ.

Generally speaking the apparatus disclosed in the accompanying drawings comprises a source of motive power which in the present instance takes the form of a pair of electric motors 1 and 2, a direct driving mechanism for each of the motors 3 and 4 for connecting the motors to the driving shaft, and a reversing differential gear 5.

More specifically describing the invention, the direct driving mechanism 3 comprises a magnetic clutch having one of the members 6 thereof keyed or otherwise secured to the driven shaft 7, and the other member 8 thereof loosely mounted upon the shaft 7 and connected to a gear wheel 9, which in turn is adapted to be driven through the idler 10 from a pinion 11 mounted upon the shaft of the motor 1. The direct driving mechanism 4 likewise comprises a magnetic clutch having one of the members 12 thereof keyed or otherwise secured to the shaft, and the opposite member 13 loosely mounted upon the shaft and connected with a gear 14 driven through an idler 15 from a pinion 16, mounted upon the shaft of the armature of the motor 2. The motors in the present instance are adapted to be driven in opposite directions, whereby when one of the direct driving clutches is connected, the shaft 7 will be driven in one direction, and when the opposite clutch is connected the shaft will be driven in an opposite direction.

The reversing differential gear 5, one form of which I have specifically illustrated in an application filed by me August 27th, 1907, Serial No. 390,303, comprises a hub or central member 17, keyed to the shaft 7 and having a pair of oppositely disposed arms 18 upon which are mounted two rotating beveled gears 19 and 20 respectively; and the driven members 21 and 22 of the differential gear, which take the form of beveled gears loosely mounted upon the shaft 7, and are adapted to mesh with the beveled gears 19 and 20. Upon extensions of the hubs of the beveled gears 21 and 22 are respectively mounted members 23 and 24 of a pair of magnetic clutches. The opposite members 25 and 26 of the clutches are connected to gears 27 and 28, which are respectively driven from pinions 29 and 30, mounted respectively upon the shaft of the armatures of the motors 2 and 1. The driven shaft 7 is adapted to be connected by a suitable gearing 31 with a gun or turret operating mechanism, the shaft of which is shown.

The pinions 11 and 16 of the motors 1 and 2 are respectively constructed to drive their respective gears at a speed ratio of 6:1, while the pinions 30 and 29 of the motors 1 and 2 are adapted to drive their gears at a speed ratio of 9:1. This speed ratio has been selected as offering certain advantages in the operation of the particular mechanism to which the present apparatus is applied, but it will be understood that various modifications may be made thereof, without departing from the spirit of my invention.

In operation assume, for the purpose of fully understanding the operation of the device, that the normal speed of each of the motors 1 and 2 is 300 revolutions per minute. With the clutches of the direct drive gears 3 and 4 deënergized or disconnected, and the clutches of both the driven members of the differential gear energized or connected, then the two driven members 21 and 22 of the differential will be driven in opposite directions at the same relative speed, and no motion will be transmitted to the hub 17 and through the hub 17 to the shaft 7. We will assume now that leaving the speed of the motor 2 at normal, the speed of the motor 1 is run up to its maximum speed of 1200 revolutions per minute. Under these conditions the driven member 22 of the differential gear will be rotated at a corresponding increase of speed over the driven member 21 of the differential gear, thereby imparting motion to the hub 17 and causing the same to rotate the shaft in one direction. In order to reverse the direction of operation of the shaft 7, the conditions above may be reversed, and instead of increasing the speed of the motor 1 over the speed of the motor 2, the motor 2 is run up to its increased speed, while the motor 1 runs at its normal speed, under which conditions the shaft 7 will be rotated in an opposite direction. Assume, after the motor 1 has been run up to its maximum speed of 1200 revolutions per minute, that it is desired to still further increase the speed at which the shaft 7 is rotated. The direct driving train 4 is then thrown into engagement by energizing the clutch thereof, and disconnecting the clutch members 23 and 24 of the differential gear, thus permitting the motor 2 to drive the shaft directly through the direct driving train 4. When the motor 2 is running at its lowest speed and the direct drive thereof is thrown into operation and the differential is thrown out of operation, the motor 2 will continue to drive the driven shaft at the same speed at which it was driven through the differential at the time of the change. If now the speed of motor 2 is increased it is obvious that the speed of the driven shaft will also be increased and proportionally with the increase in speed of the motor 2. It is apparent that when the clutch of the direct driving train 3 is energized, and the clutch of the direct driving train 4 is deenergized, the shaft will be driven in a similar manner in an opposite direction by motor 1. It is understood that although the motors have been described as running at the same speed under normal conditions, and as running in opposite directions, a change in the gearing may be made whereby, while the motors operate at different speeds, the driven members 14 and 9 may be driven at the same speed, and the driven members 21 and 22 of the differential gear may also be driven in opposite directions with the motors running in the same direction by suitable change of gearing. It is also understood that while I have described the magnetic clutches as being magnetic clutches, any other form of clutch may be used if desired.

Fig. 2 diagramatically illustrates a simple form of controller for my variable speed mechanism and the electrical connections between said controller and the motors and the clutches. The motor 1 is provided with an armature 32 and a field 33. The motor 2 is provided with an armature 34 and a field 35. The clutch for the direct drive of motor 1 is provided with a winding 36 and the clutch for the direct drive of motor 2 is provided with a winding 37. The clutch connecting motor 1 with the differential gear is provided with a winding 38 and the clutch for connecting motor 2 to the differential gear is provided with a winding 39. Each of the windings 36, 37, 38 and 39 when energized is adapted to attract its corresponding clutch member for the purpose hereinafter described. The starter by which the motors are initially started in operation is provided with a switch 40, which moves over a series of contacts 41 connected to a starting resistance 42. The switch is held in its final position by means of a retaining magnet $m$. It will of course be understood that any means may be employed to start the motors. I have simply shown a conventional starter for the purpose of illustration. The controller is provided with a pivoted contact arm 43 which normally stands in the position illustrated in the drawing and may be moved either to the right or to the left. On the right hand side of the arm 43 is a series of contacts 44 connected to a field resistance 45 for the motor 1. Beyond the contacts 44 is a segment 46. On the left hand side of the controller arm is a segment 47, and beyond segment 47 is a series of contacts 48 connected with the resistance 49, also for the field of motor 1. In the same arc as the contact 44, is a segment 50, and in the same arc as the segment 46 is a series of contacts 51 connected to a resistance 52 for the field of motor 2. In the same arc as the segment 47 is a series of contacts 53 connected to a resistance 54 also for the field of motor number 2, and in the same arc as contacts 48 is a segment 55. In the same arc as the contacts 53 and segment 50 is the segment 56, and in the same arc as the contacts 51 is a segment 57. In the same arc as the segment 55 is the segment 58. The controller arm 43 is provided with contacts adapted to move over the aforesaid contacts and segments, but when in a central position engage segments 47, 50, and 56. The segment 56 is connected to the clutch windings 38, 39, the segment 57 is connected to the clutch winding 37, and the segment 58 is connected to the clutch winding 36.

I shall now describe the operation of the controller and the action it produces upon my variable speed mechanism. If the main line switch 59 be closed and the switch arm 40 of the starter be moved to the right the motors will both be started in opposite directions, and assuming that the controller arm 43 is in the central position as illustrated in the drawing, the motors will attain the same speed of 300 revolutions per minute. The armature circuits for these motors extend from the positive side of the main line through conductor 60, thence through the armatures 34 and 32, conductor 61, and switch 40 to the negative side of the main line. The field circuit of motor 1 extends from conductor 60 through the field winding 33, conductor 62 to the segment 47, through the controller arm 43, and thence by a conductor 63 to the negative side of the main line. The field circuit for motor 2 may be traced from conductor 60, through field winding 35, by conductor 64 to segment 50, thence through the arm 43 and conductor 63 to the negative line. When the arm 43 is in its central position, as shown, and the motors running at the same speed, circuit will be closed through the clutch windings 38 and 39, and may be traced from conductor 60 to conductor 65, through the windings 38 and 39, conductor 66 to segment 56, thence through the arm 43 and conductor 63 to the negative line. It will thus be seen that the direct drive clutches are inoperative while the clutches connecting both of the motors to the differential gear are operative, whereby the differential gear will be driven by both motors, said motors running in opposite directions at the same rate of speed. Under these conditions the driven shaft will remain stationary. Assuming now that it is desired to impart motion to the driven shaft, the arm 43 is moved either to the right or to the left in accordance with the direction in which it is desired to drive the driven shaft. First assuming that the arm 43 is moved to the right, the resistance 45 will be gradually inserted into the field circuit of motor 1, until the speed of said motor reaches 1200 revolutions per minute. The difference in ratio of the speeds of the two motors as now driven cause the driven shaft to rotate the speed of the driven shaft depending upon the difference in the relative speeds of the motors. When all of the resistance 45 is inserted into the field of motor 1, the driven shaft will rotate at 50 revolutions per minute. If now it is desired to further increase the speed of the driven shaft, the movement of the arm 43 is continued in the same direction, causing the arm 43 to leave the segment 56, thus opening the circuits through and deënergizing the clutch windings 38 and 39, and consequently releasing the differential gear. As soon as the arm 43 engages the segment 57, circuit will be closed through and energize clutch winding 37. The circuit through winding 37 may be traced from conductor 60 to conductor 65, through clutch winding 37, conductor 67 to segment 57, thence through the arm 43 and conductor 63 to the negative side of the line. As soon as the clutch winding 37 is energized it attracts the clutch in the direct drive of the motor 2, causing motor 2 to drive the driven shaft in the same direction and at first at the same speed of 50 revolutions per minute. As the arm 43 continues to move over the contacts 51 it gradually inserts the resistance 52 into the circuit of the field of motor 2, thereby gradually increasing the speed thereof, and consequently increasing the speed of the driven shaft. If now the arm 43 is moved to the left it will first gradually insert the resistance 54 into the circuit of the field of motor 2, thereby increasing the speed of motor 2 which causes a difference in ratio of the speeds of the two motors and consequently imparts motion to the driven shaft through the differential gear in an opposite direction to that previously described. After motor 2 reaches its highest speed a continued movement of the arm 43 will first deënergize the clutch windings 38 and 39, causing the result already described, and will then energize the clutch winding 36 and thereby throw in the direct drive of the motor number 1. A further movement of the arm 43 will then insert the resistance 49 into circuit with the field of motor 1, thereby increasing the speed of the motor 1 and consequently the speed of the driven shaft. It will therefore be seen that the cycle of operation when the arm 43 is moved either to the right or to the left is the same, with the exception that the direction of movement of the arm 43 controls the direction of movement imparted to the driven shaft. It will also be seen that various speeds may be imparted to the driven shaft through the differential gear and that various higher speeds may be obtained through the direct drive.

Various other changes may be made in my apparatus and the arrangement of parts forming same, to accomplish the same object without departing from the spirit of my invention, as set forth in the accompanying claims.

Having thus described my invention what I claim as new and desire to secure by Letters Patent, is:—

1. The combination with a driven member, of a differential gear operatively arranged with respect thereto, other gearing operatively arranged with respect to said member, and means for operating said shaft through said differential gear or through said other gearing.

2. The combination with a driven member, of a pair of electric motors for operating the same, a differential gear, other gearing, and means for connecting said motors to said driven member either by said differential gear or by said other gearing.

3. The combination with a driven shaft, of a differential gear operatively arranged with respect thereto and adapted to operate the shaft in either direction, other gearing for operating said shaft in either direction independently of said differential gear, and means for operating said shaft through said differential gear or through said other gearing.

4. The combination with a driven shaft, of a pair of motors for operating the same, a differential gear for connecting said motors to said shaft, and means for operating said shaft from said motors independently of said differential gear.

5. The combination with a driven shaft, of a differential gear, a pair of motors, and clutch controlled means for operatively connecting said motors to said driven shaft through said differential gear or for establishing an operative connection between one of said motors and said shaft independent of said differential gear.

6. The combination with a driven shaft, of a differential gear operatively connected in respect thereto, a pair of motors, and clutch controlled means for operatively connecting said motors to said shaft through said differential gear or establishing an operative connection between one or the other of said motors and said shaft for operating said shaft in either direction independently of said differential gear.

7. The combination with a driven shaft, of a pair of motors operating in opposite directions, means for establishing a driving connection between either of said motors and said shaft, a differential gear, and means for operatively connecting said motors to said shaft through said differential gear.

8. The combination with a driven shaft, of a pair of operating motors adapted to run in different directions, means connecting said motors and shaft for changing the direction of rotation of said shaft by varying the speed of said motors, and means for independently driving said shaft from one or the other of said motors.

9. The combination with a driven shaft, of a differential gear operatively arranged with respect thereto, a pair of motors adapted to operate the driven members of said differential gear at relative speeds to attain zero speed of the shaft, and adapted to vary the speed of said driven members to rotate said shaft, and a driving mechanism for connecting said motors to the shaft independently of said differential gear to increase the speed of rotation thereof after the variance in the speed of the driven members of the differential gear has reached its maximum.

10. The combination with a driven shaft of a pair of motors, an operative connection between said motors and said shaft including a differential gear, and means for establishing a driving connection between said shaft and one of said motors for enabling said shaft to be accelerated above the speed obtainable through said differential gear.

11. The combination with a driven shaft, of a pair of motors, a differential gear, means for connecting said motors to said driven shaft through said differential gear, means for connecting either of said motors to said driven shaft to drive the same independently of said differential gear, and a single controller for said motors adapted to vary the speeds of the same relatively to vary the direction and speed of rotation of said driven shaft.

12. The combination with a driven shaft, of a pair of motors, a differential gear, electro-magnetically controlled means for operatively connecting said motors to said shaft through said differential gear, and a single controller for controlling the operation of said motors and said means.

13. The combination with a driven shaft, of a pair of motors, a differential gear, and electro-magnetically controlled means for operatively connecting said motors to said shaft through said differential gear or establishing a driving connection between one of said motors and said shaft independent of said differential gear.

14. The combination with a driven shaft, of a pair of motors, a differential gear, electro-magnetically controlled means for operatively connecting said motors to said shaft through said differential gear or establishing a driving connection between one of said motors and said shaft independent of said differential gear, and a single controller for controlling said means to vary the driving connections and for varying the speed of either motor.

15. In combination, a driven shaft, a differential gear, two motors, electromagnetically controlled connection for enabling said motors to drive said shaft through said differential gear, electromagnetically controlled connections for enabling either of said motors to drive said shaft independently of said differential gear, and a controller adapted to be operated to cause said first mentioned connections to be established and to control the relative speed of said motors to cause said shaft to be operated at variable speeds in either direction, said controller being also operable to cause said second mentioned connections to be established and to vary the speed of the operating motor to accelerate the driven shaft in either direction above the speed obtainable through said differential gear.

16. The combination with a driven shaft, of a differential gear operatively mounted in respect to said shaft, two motors for operating said differential gear, means to connect said motors to said differential gear, and means to connect said motors to said shaft independently of said differential gear, and a single device to control both of said means whereby the shaft will first be driven through said differential gear and then independently by one of said motors.

17. The combination with a driven shaft, of a differential gear operatively connected thereto, two motors, operative connections including a magnetic clutch, between each motor and one member of said differential gear, other driving mechanism including a magnetic clutch between each motor and said shaft, and a single controller for varying the speeds of said motors and for controlling said clutches to cause said shaft to be operated in either direction and to vary the speed thereof in small increments or decrements throughout a wide range.

18. The combination with a mechanism to be operated, of a shaft for operating said mechanism, a differential gear operatively arranged in respect to said shaft, other driving mechanism for said shaft, and means for operating the shaft through said differential gear, or through said other driving mechanism.

19. The combination with a mechanism to be operated, of a differential gear, independent gearing, two motors, and means for operatively connecting said motors to said mechanism through said differential gear or connecting said motors individually to said mechanism through said independent gearing.

20. The combination with a mechanism to be operated, of a shaft for operating said mechanism, a pair of motors for operating said shaft, means including a differential gear for connecting said motors to said shaft, and means for operating said shaft from either of said motors independently of said differential gear.

21. The combination with a mechanism to be operated, of a shaft for operating said mechanism, a differential gear operatively arranged with respect to said shaft, a pair of motors and electromagnetic clutch controlled means for connecting said motors to the driving members of said differential gear.

22. The combination with a mechanism to be operated, of a differential gear, a pair of motors for jointly operating said mechanism through said differential gear, electromagnetic clutch controlled connections between said motors and said differential gear, other drive gearing interposed between said mechanism and one or both of said motors, and a magnetic clutch for controlling the latter gearing of each motor.

23. The combination with a mechanism to be operated, of a shaft for operating said mechanism, a differential gear operatively mounted in respect to said shaft, a pair of motors for operating said differential gear, electromagnetically controlled means to connect said motors to said differential gear, electromagnetically controlled means to connect said motors to said shaft to independently of said differential gear drive the same, and a single controller for said motors and said electromagnetic means whereby the motors are first caused to drive said shaft through said differential gear, then one motor caused to independently drive said shaft.

24. The combination with a driven shaft, of a pair of motors adapted to operate in opposite directions, a pair of gears mounted on the armature shaft of each motor, a differential gear associated with said driven shaft, clutches adapted to engage the driving members of said differential gear, gears on one member of said clutches adapted to mesh with one of the gears on the armature shafts, clutches on the driven shaft, gears on one member of said last mentioned clutches adapted to be operated by the other gears on the armature shafts, and means to control the operation of said clutches.

25. The combination with a driven shaft, of a pair of motors adapted to operate in opposite directions, a pair of gears mounted on the armature shaft of each motor, a differential gear associated with said driven shaft, electromagnetic clutches adapted to engage the driving members of said differential gear, gears on one member of said clutches adapted to mesh with one of the gears on the armature shafts, electromagnetic clutches on the driven shaft, gears on one member of said last mentioned clutches adapted to be operated by the other gears on the armature shafts, and a controller for said motors and electromagnetic clutches.

26. In combination, a driven member, a differential gear, two motors, a plurality of magnetic clutches, means controlled by certain of said clutches for operatively connecting said motors to said driven member through said differential gear, means controlled by other of said clutches for establishing a driving connection between either of said motors and said driven member independently of said differential gear, and a common controller for said clutches and said motors, said controller being operable to cause said driven member to be driven at variable speeds in either direction through said differential gear and being operable thereafter to cause said driven member to be driven in either direction at one or more speeds above the highest speed attainable through said differential gear.

In witness whereof, I have hereunto subscribed my name in the presence of two witnesses.

THOMAS E. BARNUM.

Witnesses:
ALEXANDER H. LIDDERS,
FRANK H. HUBBARD.